United States Patent [19]

Arnaud et al.

[11] Patent Number: 5,420,919
[45] Date of Patent: May 30, 1995

[54] TELEPHONE LINE CURRENT MODULATOR

[75] Inventors: Thierry Arnaud, Toulouse; Bruno Defretin, Meylan, both of France

[73] Assignee: SGS-Thomson Microelectronics S.A., Gentilly, France

[21] Appl. No.: 10,266

[22] Filed: Jan. 28, 1993

[30] Foreign Application Priority Data

Jan. 29, 1992 [FR] France .................. 92/01244

[51] Int. Cl.⁶ .............................................. H04M 1/62
[52] U.S. Cl. ..................... 379/387; 379/388; 379/395
[58] Field of Search ............ 379/387, 388, 389, 390, 379/395, 413, 391, 392, 400, 405; 330/202, 297

[56] References Cited

U.S. PATENT DOCUMENTS

| | | | |
|---|---|---|---|
| 4,408,153 | 10/1983 | Terry | 379/400 |
| 4,445,002 | 4/1984 | Terry | 379/391 |
| 4,453,037 | 6/1984 | Terry | 379/400 |
| 4,513,178 | 4/1985 | Hing et al. | 379/387 |
| 4,649,235 | 3/1987 | Sijbers | 379/395 |
| 4,731,831 | 3/1988 | Cosgrove et al. | |
| 4,742,539 | 5/1988 | Szlam | 379/387 |
| 4,847,898 | 7/1989 | Doll et al. | 379/395 |
| 4,856,057 | 8/1989 | Snith et al. | |
| 4,894,863 | 1/1990 | Naurotil et al. | 379/395 |
| 5,027,392 | 7/1991 | Thomas et al. | |
| 5,059,921 | 10/1991 | Vyne et al. | 330/297 |

FOREIGN PATENT DOCUMENTS

WOA8503614 2/1985 Germany .

OTHER PUBLICATIONS patent Abstracts of Japan, vol. 10, No. 192 (E-417) (2248) Jul. 5, 1986.
Patent Abstracts of Japan, vol. 9, No. 280 (E-356)(2003) Nov. 8, 1985.
SGS-Thomson Microelectronics TEA7063 "Speed Circuit With Power Management" Jun. 1990 Datasheet.

*Primary Examiner*—James L. Dwyer
*Assistant Examiner*—Scott L. Weaver
*Attorney, Agent, or Firm*—Wolf, Greenfield & Sacks

[57] ABSTRACT

A telephone set connected to a telephone line including a supply circuit providing an output current which is an increasing function of the voltage available on the telephone line; a speech amplifier supplied by the output current; and a modulator having a quiescent current and operable to inject into the line a modulation current proportional to a speech signal. The modulator incorporates the supply circuit, the current consumed by the modulator being essentially the current provided to the amplifier by the supply circuit.

10 Claims, 2 Drawing Sheets

TELEPHONE LINE CURRENT MODULATOR

BACKGROUND OF THE INVENTION

1. Field of the Invention

The present invention relates to telephone sets including a speech amplifier for transmitting on a loudspeaker the voice of the correspondent.

2. Discussion of the Related Art

FIG. 1 schematically shows a simplified architecture of a telephone set with a speech amplifier. A telephone line (not shown) is connected to an active terminal E and to a ground terminal G. The voltage available between terminal E and ground is referenced $V_L$ and the line current is referenced $I_L$.

The telephone set comprises a template and supply circuit 10 for an amplifier 12 connected to a loudspeaker 13. Template circuit 10 is designed to establish a standard characteristic $V_L = f(I_L)$ of line voltage $V_L$ versus line current $I_L$. The current consumed to establish this characteristic is used to supply amplifier 12.

Circuit 10 comprises a voltage to current converter 15 having a transconductance G, supplied by the line voltage $V_L$, and injecting a current $I_0$ into a capacitor C connected to ground and into amplifier 12. The input voltage of converter 15 is established to a value $V_L - V_1$ by a constant voltage source $V_1$ connected between terminal E and the input of converter 15.

This configuration achieves, on the one hand, a supply current $I_0$ of amplifier 12 increasing as a function of the line voltage $V_L$ and, on the other hand, the characteristic $V_L = f(I_L)$ of the template. ("Amplifier supply current" is to be construed as the sum of the currents flowing through amplifier 12 and capacitor C).

The parameters of the template circuit 10 ($V_1$, G) are selected to account for currents consumed by other elements of the telephone set. These other elements comprise a current modulator 16 and additional circuits 17. Additional circuits 17, as for example a microprocessor, consume a constant current $I_1$. Current modulator 16 serves to modulate the line current $I_L$ as a function of a speech signal $V_m$. The current flowing through the modulator is referenced $I_m$ and has a d.c. component $I_{m0}$. Thus, at any time, there is a mean line current $I_L = I_0 + I_{m0} + I_1$. Within this disclosure, a current modulator is defined as a device which adds an AC component to a DC current, wherein the AC component is proportional to a voltage input to the device.

FIG. 2 illustrates a particular embodiment of a template circuit 10 using current mirror circuitry which is particularly suitable for integrated circuit design. Circuit 10 comprises a current mirror M1 connected to terminal E and receiving at its input a reference current $i_0$, which is low as compared to line current $I_L$. Current mirror M1 is a multiplier by a factor K, which factor is high with respect to 1 (approximately 40) and provides the supply current $I_0 (= K i_0)$ for amplifier 12. Reference current $i_0$ is drawn by a current generator 18, generally a shunt regulator, comprising a voltage to current converter 19 having a transconductance g. Converter 19 is connected to a voltage source $V_1$ in the same configuration as source $V_1$ and converter 15 of FIG. 1. This configuration is equivalent to circuit 10 of FIG. 1 with Kg = G. Elements of such circuits are described in the data sheet of the SGS Thompson Microelectronics TEA 7063 Speech Circuit With Power Management Device.

In practice, in order to have modulator 16 modulating line current $I_L$ with a sufficiently high amplitude, it needs a quiescent current $i_{m0}$ of approximately 5 mA. In addition, current $I_1$ consumed by the additional circuits 17 is approximately 5 mA.

The available line current $I_L$ can, according to the nature and length of the line, have a low value, approximately 15 mA only; hence, only a low current (5 mA) is available to supply amplifier 12 (not taking into account a current close to $i_0$ used by the template circuit 10 and not provided to the amplifier).

PCT application 8,503,614 describes a particular architecture of a telephone set having a speech amplifier, wherein the line modulation current is exploited to supply the speech amplifier, which adds the quiescent current of the modulator to the supply current of the speech amplifier.

However, the solution used in the above PCT application for exploiting the modulation current is not applicable to architectures using current mirrors, such as that of FIG. 2.

SUMMARY OF THE INVENTION

An object of the invention is to exploit the modulation current to supply the speech amplifier in a telephone set architecture using current mirrors.

This object is achieved with a telephone set connected to a telephone line and comprising: a generator of a reference current $i_0$ proportional to the difference of an available line voltage $V_L$ and a reference voltage $V_1$; a current mirror receiving an input current proportional to the reference current and supplying a speech amplifier with a current which is great with respect to the input current; and a current modulator, whose quiescent current is established by the reference current and providing the input current to the mirror.

The foregoing and other objects, features, aspects and advantages of the invention will become apparent from the following detailed description of preferred embodiments when taken in conjunction with the accompanying drawings.

BRIEF DESCRIPTION OF DRAWINGS

In the drawings, same references designate same elements.

DETAILED DESCRIPTION

Figure 3:
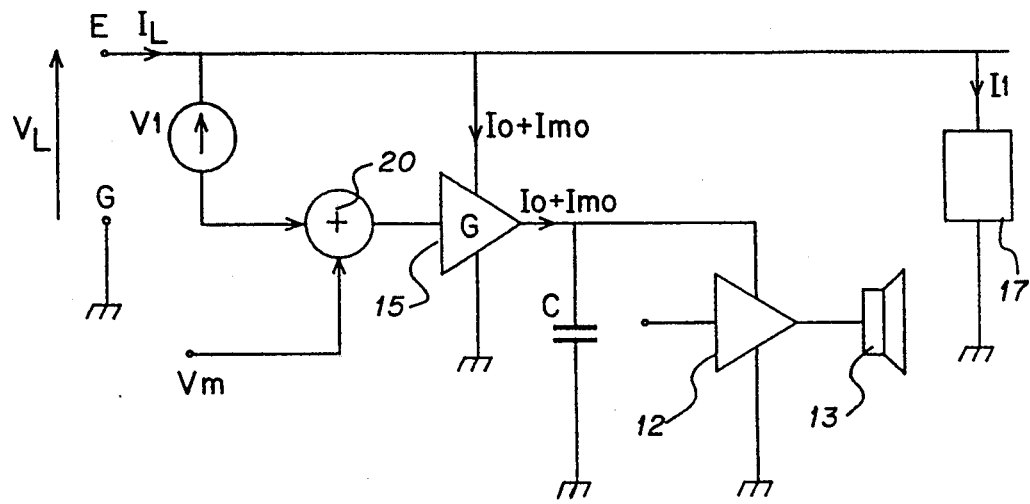
FIG. 3 is intended to show the principle of exploiting a modulation current for supplying a speech amplifier.

In FIG. 3, a modulator is incorporated in the supply circuit 10 of amplifier 12 and the quiescent current of the modulator constitutes the supply current of amplifier 12. The quiescent current of this modulator is selected to be equal to the sum of the conventional supply current $I_0$ plus the quiescent current $I_{m0}$ of the conventional modulator 16. Thus, current $I_{m0}$, instead of being consumed uselessly contributes to increase the current provided to amplifier 12. The term "conventional" within the context of this specification, refers to, for example, a SGS Thompson Microelectronics TEA 7063 Speech Circuit With Power Management Device.

A summer 20 is disposed at the input of converter 15. Summer 20 receives as an input the voltage of source $V_1$ and the speech signal $V_m$. Thus, at the input of converter 15, the conventional voltage $V_L-V_1$ is still applied. The speech signal $V_m$ is superimposed on the voltage $V_L-V_1$ by summer 20.

With this configuration, those skilled in the art will be able to readjust voltage $V_1$ so that, in the absence of speech signal $V_m$, the output current of converter 15 (therefore the supply current of amplifier 12) is equal to $I_0+I_{m0}$. Then, the mean line current $I_L$ is exactly expressed in the same way as for FIG. 1, that is, by $I_L = I_0 + I_1 + I_{m0}$. The telephone set therefore complies with the template $V_L = f(I_L)$ requirement. The maximum amplitude of speech signal $V_m$ can be readjusted so that the line current $I_L$ is modulated with an adequate amplitude.

Figure 1:
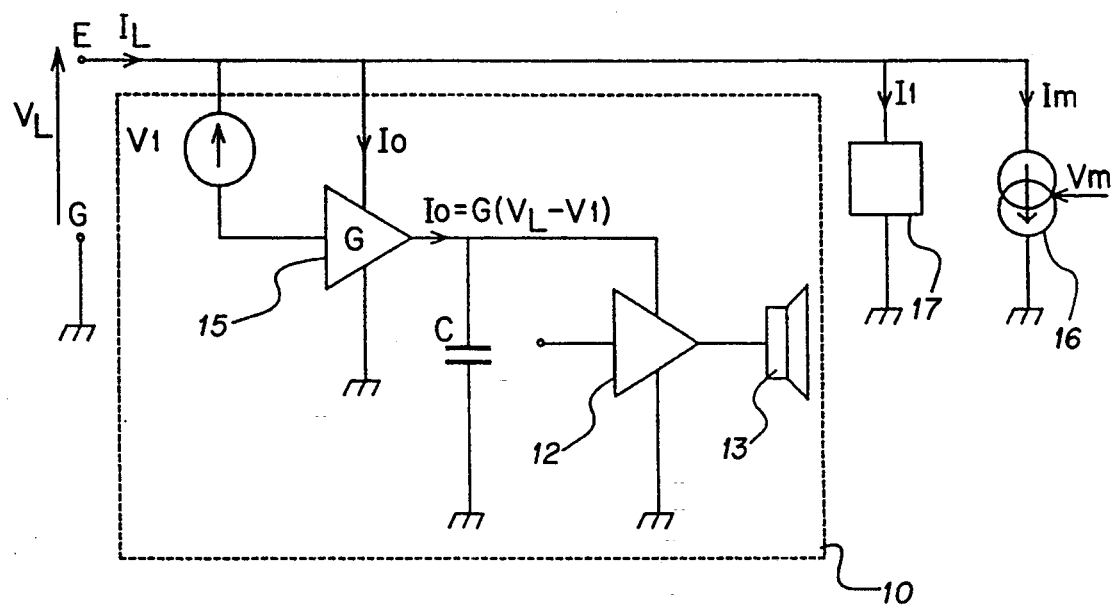
FIG. 1, above described, schematically shows a conventional architecture of a telephone set with a speech amplifier.

Thus, as compared with the example of FIG. 1, the current provided to amplifier 12 is increased by $I_{m0}$, that is, by the value (5 mA) of the quiescent current of the conventional modulator 16. In the example where the line current $I_L$ reaches a minimum value of 15 mA, the current provided to amplifier 12 has a value practically twice as high as in a conventional telephone set.

Figure 2:
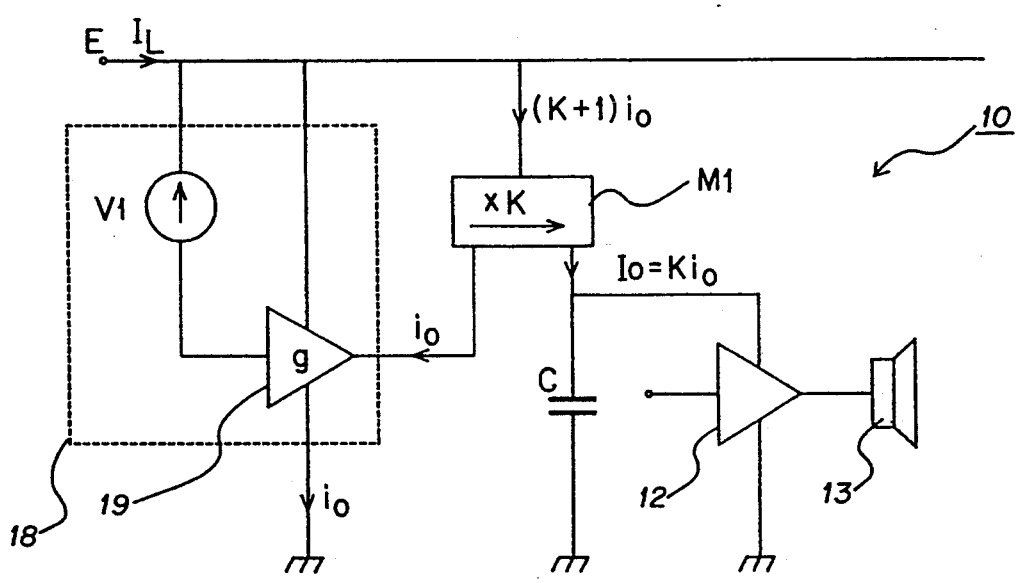
FIG. 2, above described, shows in more detail the architecture of FIG. 1.
Figure 4:
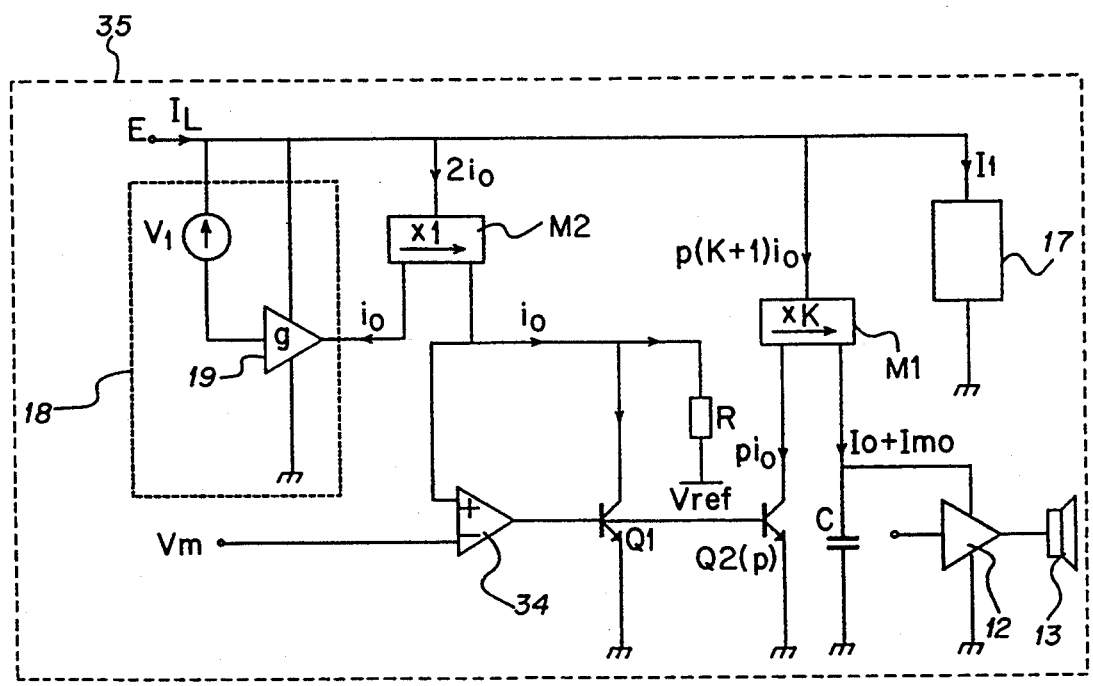
FIG. 4 shows an embodiment of a telephone set according to the invention.

FIG. 4 illustrates an embodiment of a telephone set 35 according to the invention, adapted to the conventional architecture of FIG. 2. FIG. 4 shows again the current generator 18 and current mirror M1.

According to the invention, here the reference current $i_0$, normally provided by generator 18 to mirror M1, is supplied to the input of a current mirror M2 connected to terminal E. Mirror M2 distributes current $i_0$ among a resistor R connected to a reference voltage Vref and the collector of a transistor Q1 having its emitter connected to ground. The base of transistor Q1 is connected to the output of an operational amplifier 34 having its non-inverting input connected to the collector of transistor Q1, its inverting input receiving speech signal $V_m$. A transistor Q2 is connected in parallel to the base and emitter of transistor Q1 and its collector is connected to the input of mirror M1; this arrangement duplicates the collector current of transistor Q1 to the input of mirror M1 and multiplies it by a factor p equal to the surface ratio of transistors Q2 and Q1.

With this configuration, speech signal $V_m$ appears at the junction between resistor R and the output of mirror M2. The reference voltage Vref is selected to be equal to the quiescent value of speech signal $V_m$. Thus, in the absence of speech signal $V_m$, the entire reference current $i_0$ flows through transistor Q1. A current $pi_0$ therefore appears at the input of mirror M1, and a supply current of amplifier 12 having a value $pKi_0$ appears at the output of mirror M1. The current drawn from the telephone line in the place of current $I_0+I_{m0}$ of the above drawings is equal here to $[2+p(K+1)]i_0$, this current being essentially current $pKi_0$ supplied to amplifier 12 since K is high (approximately 40) with respect to 1. Those skilled in the art will be able to readjust voltage $V_1$ so as to obtain $[2+p(K+1)]i_0 = I_0+I_{m0}$ in order to comply with the template $V_L = f(I_L)$ requirement.

When a speech signal $V_m$ is applied, a modulated current flows through resistor R; this current is subtracted from current $i_0$ flowing through transistor Q1. In transistor Q1, a current modulated around $i_0$ flows that is amplified by transistor Q2 and mirror M1 before being drawn from the telephone line. Those skilled in the art will be able to select resistor R so that the line current is modulated with a sufficiently high amplitude.

As is apparent to those skilled in the art, various modifications can be made to the above disclosed embodiments, more particularly in the realization of the modulator.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. A telephone set comprising:
a generator of a reference current proportional to a difference between an available line voltage and a reference voltage;
a current modulator, coupled to the reference current generator, having a quiescent current set by the reference current and being responsive to a speech signal for varying the quiescent current;
a current mirror, coupled to the current modulator, having an input receiving an input current provided by the current modulator and supplying a speech amplifier of the telephone set with a current having a magnitude that is large compared to the input current;
wherein the current modulator comprises a first transistor and a resistor, and a second transistor that duplicates and provides multiplication of a current flowing through the first transistor wherein a current flowing through the second transistor provides the input current.

2. The telephone set of claim 1, wherein the current modulator further comprises an amplifier having an output coupled to and controlling a base of the first transistor and a base of the second transistor, the amplifier further having two differential inputs, one of the differential inputs receiving a speech signal and the other of the differential inputs coupled to a junction of the first transistor and the resistor.

3. The telephone set of claim 1, wherein the quiescent current of the current modulator is selected to be equal to a sum of a nominal supply current of the speech amplifier and a predetermined fixed value of a quiescent current characteristic of a predetermined current modulator.

4. The telephone set of claim 1, wherein the current supplied by the current mirror is distributed between the speech amplifier and a filtering capacitor.

5. The telephone set of claim 1, wherein the current mirror has a multiplication factor that is approximately forty.

6. A telephone set comprising:
a current generator generating a reference current proportional to a difference between an available line voltage and a reference voltage;
a current modulator, coupled to the current generator, having a quiescent current set by the reference current and being responsive to a speech signal to vary the quiescent current;

a current mirror, coupled to the current modulator, having an input receiving an input current provided by the current modulator and having an output supplying a speech amplifier of the telephone set with a current having magnitude greater than the input current;

wherein the current modulator comprises:
  a first transistor coupled to a resistor; and
  a second transistor, coupled to the first transistor, that duplicates and provides multiplication of a current flowing through the first transistor so that a current flowing through the second transistor provides the input current.

7. The telephone set of claim 6, wherein the current modulator further comprises an amplifier having an output coupled to and controlling a base of the first transistor and a base of the second transistor, the amplifier further having two differential inputs, one of the differential inputs receiving a speech signal and the other of the differential inputs coupled to a junction of the first transistor and the resistor.

8. The telephone set of claim 6, wherein the quiescent current of the current modulator is equal to a sum of a nominal supply current characteristic of the speech amplifier and a quiescent current of a predetermined current modulator.

9. The telephone set of claim 6, further comprising a filtering capacitor coupled to the current mirror and the speech amplifier, and wherein the current supplied by the current mirror is distributed between the speech amplifier and the filtering capacitor.

10. The telephone set of claim 6, wherein the current mirror has a multiplication factor that is approximately forty.

* * * * *